Feb. 11, 1936.  M. S. STEWART  2,030,274
FOOD STRAINER
Filed Oct. 20, 1933
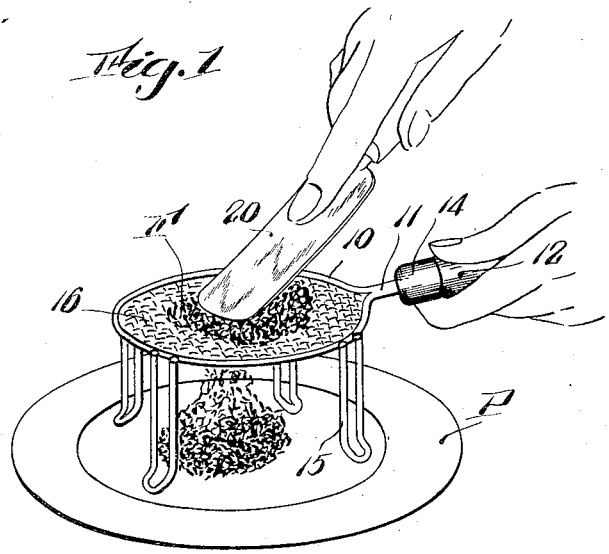
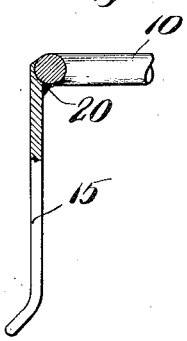
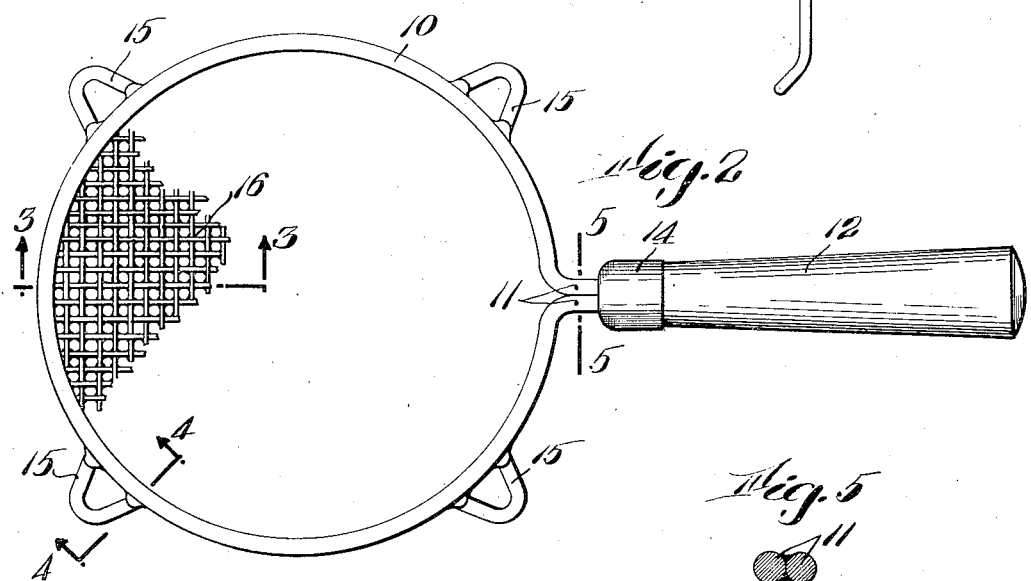
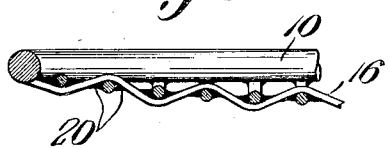
Inventor
Marion Savage Stewart
By Roberts, Cushman & Woodbury
his Attorneys Patented Feb. 11, 1936

2,030,274

UNITED STATES PATENT OFFICE 2,030,274

FOOD STRAINER

Marion Savage Stewart, Wellesley, Mass.

Application October 20, 1933, Serial No. 694,395

2 Claims. (Cl. 210—161)

This invention relates to a food strainer and more particularly to a strainer of the type used in connection with the preparation of infants' foods.

In preparing infants' food in accordance with the well recognized principles of infant hygiene, it is the usual practice to reduce all solid foods to a granular or relatively fine state, thereby eliminating all large, hard and other relatively indigestible substances, such as skins, stems, and the coarse fibrous constituents of fruits and vegetables. The conventional cup-shaped sieve heretofore used for this purpose has proven quite unsatisfactory due to its shape and to the fact that the wire meshes yield considerably to the pressure necessary to force food through its openings, and consequently cannot be relied on to reduce the solid food to the relatively fine state desired. Moreover, its folded marginal frame and the crossing points of its wire mesh afford numerous recesses and food-collecting irregularities which not only tend to hold particles of food and hence clog the sieve when in use, but also render it quite difficult to clean, thus rendering the sieve insanitary after a relatively short period of use.

Attempts have heretofore been made to overcome these objectionable features by using perforated sheet metal as a strainer. A perforated metal plate tends to crush the food and squeeze out the juices by reason of the comparatively extensive flat surfaces between perforations, when the food is pressed through the perforations. This interferes with the reducing of solid foods to a fine state in normal, solid, and uncrushed or normally dry condition.

The principal objects of the present invention are to provide a self-supporting food strainer of unbreakable construction, which is inexpensive to manufacture and efficient in reducing the various types of infants' foods, including meats, etc. to the fine state desired, and to provide a strainer which is free from recesses and food-collecting irregularities which interfere with cleaning, and which overcomes the deficiencies and objectionable features inherent in prior constructions.

Further objects relate to the details of construction and to the manner of using my improved strainer, and will be apparent from a consideration of the following description and accompanying drawing wherein:

Fig. 1 is a perspective view of a food strainer constructed in accordance with the present invention;

Fig. 2 is a top plan view of the strainer;

Fig. 3 is a section on the line 3—3 of Fig. 2;

Fig. 4 is a section on the line 4—4 of Fig. 2; and

Fig. 5 is a section on the line 5—5 of Fig. 2.

The embodiment chosen for the purpose of illustration comprises an annular supporting frame preferably consisting of a single piece of stiff heavy wire shaped to provide an annular marginal frame 10 having its ends 11 extending radially therefrom into a recess or opening within the body portion of a handle 12. The handle 12 is provided with a reinforcing ferrule 14 which firmly grips the ends 11 and secures them to the handle.

A plurality of legs 15, preferably comprising U-shaped pieces of wire, are welded or otherwise integrally joined to the outer edge of the annular frame 10 in circumferentially spaced relation to each other, as shown in Fig. 2. A circular shaped sieve preferably consisting of a substantially flat piece of stout woven wire mesh 16 is welded or otherwise integrally joined to the lower side of the frame 10, as shown in Fig. 3, thus providing a substantially flat screening surface surrounded by the marginal frame 10 which serves as a retaining rim or rail.

When the parts are thus assembled the junctions between the legs 15, frame 10 and screening 16 may, if desired, be ground, filed or otherwise smoothed so as to eliminate all rough spots. The assemblage is then tinned and retinned or otherwise heavily plated or coated to provide a heavy rustproof coating 20, which serves as an integral reinforcement for the entire structure and fills in all crevices at the crossing points of the strands of the screening and at the junction of the screening and the frame, as shown in Fig. 3, also the crevices at the junction of the legs 15 and frame 10, as shown in Fig. 4, and at the ends 11 of the handle as shown in Fig. 5. After the tinning or similar plating process the assemblage may be chrome plated or silvered or otherwise surface coated so as to provide a desired color and finish and a strainless surface, which is smooth, continuous and free from recesses and food-collecting irregularities.

In use the strainer may be placed on a plate P or other suitable receptacle and so held in position by means of the handle 12. The desired amount of food F is placed on screen 16 and by means of a flat spatula, knife or the like implement 20, held by the user as shown in Fig. 1, the food may be easily forced through the openings in the screen onto the plate P, any stringy or bony material, hard and large particles being retained on the surface of the screen. The legs 15 support the screen the proper distance above the surface which is to receive the strained food.

The rough or uneven surface of the sieve 16 formed by the corrugations of the woven wire screening prevents the materials being strained, especially slippery foods, from sliding or skidding off the strainer while being worked by the tool 20 as they would tend to do if a smooth surface sieve were used. The marginal rim formed by the frame 10 is a further safeguard against foods slipping off the strainer, as is also the very slight downward bulge of the sieve 16 indicated in Fig. 3. It is important, however, that this slight curvature of the sieve should not be a cupping, as in an ordinary kitchen strainer, but should be so slight a departure, if any, from the flat as still to function as a substantially flat surface in cooperation with the flat tool 20.

A food strainer constructed in accordance with the present invention may be used to reduce meats, such for example as crisp bacon, liver, chicken, etc., as well as vegetables, fruits and the softer types of foods. It will be noted that the wire strands of the screen 16 constitute a minor part of the entire area of the screening surface and consequently foods may be quickly and cleanly reduced with a minimum amount of waste and without undue crushing. After use the strainer may be easily cleaned, with or without the use of a brush, either by holding it under a stream of water, or by swishing it in a pan of water, supplemented by boiling if desired, it being noted that there are no recesses or other food-collecting irregularities which interfere with a thorough cleaning.

While I have shown and described one desirable embodiment of the invention it is to be understood that the present disclosure is for the purpose of illustration only and that various changes in shape, proportion and arrangement of parts, as well as the substitution of equivalent elements for those herein shown and described, may be made without departing from the spirit and scope of the invention as set forth in the appended claims.

I claim:

1. A food strainer comprising a heavy piece of wire shaped to provide an annular support and a handle extending radially therefrom, spaced supporting legs comprising U-shaped pieces of wire having the ends welded to said annular support, and screening material welded to the lower edge of said annular support and providing a substantially flat and unobstructed screening surface surrounded by a retaining rim, said screening material, legs and annular support having a heavy coating of a non-ferrous metal which fills in all crevices and recesses at the crossing points of the strands of the screening and at the junctions of the legs, support, and screening, thereby providing a smooth, continuous, rustproof surface free from recesses and food-collecting irregularities.

2. A food strainer for use with a receptacle upon which it may be supported, said strainer comprising a heavy piece of wire bent to provide a supporting frame and a handle portion, spaced legs comprising U-shaped pieces of wire welded to the outer edge of said frame and operative to hold the frame in spaced relation to the receptacle, and screening material welded to the lower edge of said frame and providing a substantially flat and unobstructed screening surface surrounded by the inner edge of the frame which provides a retaining rim, said screening material, legs and support having a heavy coating of a non-ferrous metal which fills in all crevices and recesses at the crossing points of the strands of the screening and at the junctions of the legs, support and screening, thereby providing a smooth, continuous, rustproof surface free from recesses and food-collecting irregularities.

MARION SAVAGE STEWART.